United States Patent
Ding et al.

(10) Patent No.: US 12,379,012 B2
(45) Date of Patent: Aug. 5, 2025

(54) HYDRAULIC COMPOSITE BUSHING, AND SEALING METHOD FOR SAME

(71) Applicant: ZHUZHOU TIMES NEW MATERIAL TECHNOLOGY CO., LTD, Hunan (CN)

(72) Inventors: Xingwu Ding, Hunan (CN); Jiling Bu, Hunan (CN); Haitao Cheng, Hunan (CN); Wensong Liu, Hunan (CN); Bo Zou, Hunan (CN); Jun Luo, Hunan (CN); Feng Wang, Hunan (CN); Jicao Zou, Hunan (CN); Zhangyang Xia, Hunan (CN)

(73) Assignee: ZHUZHOU TIMES NEW MATERIAL TECHNOLOGY CO., LTD, Hunan (CN)

( * ) Notice: Subject to any disclaimer, the term of this patent is extended or adjusted under 35 U.S.C. 154(b) by 310 days.

(21) Appl. No.: 17/922,698

(22) PCT Filed: Sep. 30, 2020

(86) PCT No.: PCT/CN2020/119488
§ 371 (c)(1),
(2) Date: Nov. 1, 2022

(87) PCT Pub. No.: WO2021/238008
PCT Pub. Date: Dec. 2, 2021

(65) Prior Publication Data
US 2023/0204087 A1    Jun. 29, 2023

(30) Foreign Application Priority Data
May 27, 2020  (CN) .......................... 202010459495.X

(51) Int. Cl.
*F16F 13/14*  (2006.01)

(52) U.S. Cl.
CPC ...... *F16F 13/1463* (2013.01); *F16F 13/1454* (2013.01); *F16F 13/1481* (2013.01)

(58) Field of Classification Search
CPC .............. F16F 13/1463; F16F 13/1454; F16F 13/1481; B61F 5/32; B61F 5/50; B60G 2204/41; B60G 7/04; B62D 7/22
See application file for complete search history.

(56) References Cited

U.S. PATENT DOCUMENTS

| | | | | |
|---|---|---|---|---|
| 4,974,819 A | * | 12/1990 | Reichard | F16F 13/14 188/312 |
| 5,096,166 A | * | 3/1992 | Schwerdt | F16F 1/387 267/140.3 |

(Continued)

FOREIGN PATENT DOCUMENTS

| CN | 202132613 U | * | 2/2012 |
|---|---|---|---|
| CN | 104191927 A | * | 12/2014 |

(Continued)

OTHER PUBLICATIONS

Office Action and Search Report from corresponding Chinese Application No. 202010459495X, Feb. 24, 2021.

(Continued)

*Primary Examiner* — Vishal R Sahni
(74) *Attorney, Agent, or Firm* — Workman Nydegger

(57) ABSTRACT

A hydraulic composite bushing includes: a core shaft, with a continuously spiral fluid channel groove; a rubber member, arranged around the core shaft, and having two recesses formed radially outside of the fluid channel groove and radially opposite to each other; a support ring arranged around the rubber member; an outer cover pressing on the support ring from a radially outer side thereof; and a sealing device provided at each end of a fluid channel tube arranged within the fluid channel groove. Two ends of the fluid channel tube pass through the rubber member radially to (Continued)

extend into two hydraulic chambers respectively, with the hydraulic chambers in communication with each other through the fluid channel tube. One end of the sealing device is arranged inside the flow channel groove and the other end thereof passes through the rubber member to extend into the hydraulic chambers.

15 Claims, 6 Drawing Sheets

(56) References Cited

U.S. PATENT DOCUMENTS

| | | | |
|---|---|---|---|
| 6,749,186 | B2 | 6/2004 | Hadi et al. |
| 2010/0213651 | A1 | 8/2010 | Hori et al. |
| 2022/0196102 | A1 | 6/2022 | Luo et al. |

FOREIGN PATENT DOCUMENTS

| | | | | | |
|---|---|---|---|---|---|
| CN | 104315076 | A | * | 1/2015 | ............... F16F 13/14 |
| CN | 105605133 | A | * | 5/2016 | |
| CN | 108150536 | A | | 6/2018 | |
| CN | 108150593 | A | | 6/2018 | |
| CN | 108679145 | A | | 10/2018 | |
| CN | 110388401 | A | | 10/2019 | |
| CN | 110397700 | A | | 11/2019 | |
| CN | 210510107 | U | * | 5/2020 | |
| CN | 111706638 | A | | 9/2020 | |
| DE | 10050159 | A1 | * | 4/2002 | ............... B60G 7/02 |
| DE | 10310633 | A1 | * | 9/2004 | ............... B60G 7/02 |
| DE | 102018200344 | A1 | * | 7/2019 | ............ B33Y 80/00 |
| WO | WO-2019137645 | A1 | * | 7/2019 | ................ B61F 5/30 |

OTHER PUBLICATIONS

International Search Report from PCT Application No. PCT/CN2020/119488, Feb. 25, 2021.

* cited by examiner

HYDRAULIC COMPOSITE BUSHING, AND SEALING METHOD FOR SAME

CROSS REFERENCE OF RELATED APPLICATION

The present application claims the priority of Chinese patent application No. 202010459495.X. entitled "Hydraulic composite bushing and sealing method for same" and filed on May 27, 2020, the entire content of which is incorporated herein by reference.

FIELD OF THE INVENTION

The present invention relates to a hydraulic composite bushing for vehicles, in particular rail vehicles. The invention also relates to a sealing method for the hydraulic composite bushing.

BACKGROUND OF THE INVENTION

Hydraulic bushing is a component widely used in vehicles (such as automobiles and rail vehicles), and mainly installed on a suspension or a bogie of a vehicle for absorbing vibrations and shocks to improve the running stability and safety of vehicles. The hydraulic bushing usually includes a core shaft, a rubber member, and an outer cover arranged around the core shaft. Two hydraulic chambers filled with hydraulic fluid are provided inside the rubber member, and connected with each other through a flow channel. When the vehicle is running on a special section of a road, the wheels will drive the core shaft to move relative to the outer cover, causing the hydraulic chambers to expand and contract accordingly, so that the hydraulic fluid is able to flow between said two hydraulic chambers. In this manner, the stiffness of the hydraulic bushing can be adjusted, so that the vehicle can keep running stably.

In practical applications, when the hydraulic fluid flows through the flow channel, it is easy to flow out from a contact gap between the flow channel and other components. Accordingly, the hydraulic fluid will move laterally in the flow channel, thus seriously affecting the working performance of the hydraulic bushing. Therefore, sealing requirements for the flow channel connecting two hydraulic chambers are very high. In operation, the hydraulic bushing is subjected to load and vibration, so that the volume of the hydraulic chamber is constantly changing. In addition, the pressure of the hydraulic fluid in the hydraulic chamber is very high, which would readily lead to a surge in liquid pressure. Moreover, the space of the hydraulic chamber is limited, so that there is little room for arrangement of a sealing structure. Therefore, the sealing structure cannot withstand the liquid pressure alone, and is easily damaged, has a short service life, and cannot achieve effective sealing.

SUMMARY OF THE INVENTION

In view of the above technical problems, the present invention aims to provide a hydraulic composite bushing, which can effectively ensure the sealing performance of a flow channel pipe, a hydraulic chamber and related connecting positions, and also effectively ensure the performance of stiffness adjustment of the hydraulic composite bushing, which is very beneficial for extending the service life of the hydraulic composite bushing.

The present invention further provides a sealing method for the hydraulic composite bushing, which has high production efficiency, and can effectively enhance the sealing performance of the hydraulic composite bushing.

According to a first aspect of the present invention, a hydraulic composite bushing is proposed, comprising: a core shaft, an outer surface of which is provided with a flow channel groove continuously extending in a spiral shape; a rubber member, arranged on the core shaft and provided with two recesses diametrically opposite to each other, the recesses being arranged radially outside of the flow channel groove; a support ring, arranged around the rubber member, and covering the recesses to form two hydraulic chambers for accommodating hydraulic fluid; a outer cover press-fitted on the support ring from a radially outer side thereof; and a sealing device mounted at an end of a flow channel pipe arranged in the flow channel groove. Two ends of the flow channel pipe pass through the rubber member along a radial direction to extend into said two hydraulic chambers, respectively, so that said two hydraulic chambers are in communication with each other through the flow channel pipe. The sealing device is arranged at each end of the flow channel pipe, wherein one end of the sealing device is arranged in the flow channel groove while the other end thereof passes through the rubber member to extend into a corresponding hydraulic chamber, thus forming a seal between the flow channel pipe and the flow channel groove.

In one embodiment, a pressing sleeve is provided between the core shaft and the rubber member, and formed into one piece with the core shaft through injection molding of plastic, rubber or polyurethane material, for press-fitting the flow channel pipe into the flow channel groove.

In one embodiment, the sealing device comprises a cylindrical sealing body, which is provided with a mounting portion axially penetrating the sealing body and a rectangular through hole extending in the radial direction. The end of the flow channel pipe passes through the rectangular through hole and is fitted in the mounting portion, so that the pressing sleeve fills the rectangular through hole to enclose the flow channel pipe during the injection molding, thereby forming the seal.

In one embodiment, a first end of the sealing body is fitted with the flow channel groove, and a second end thereof passes through the rubber member to extend into a corresponding hydraulic chamber, wherein a tip of the second end extends beyond a radially inner sidewall surface of the hydraulic chamber by at least 5 mm.

In one embodiment, the end of the flow channel pipe is fixedly connected with a filter element via the sealing device.

In one embodiment, a key slot is provided at each end of the flow channel groove, and a first end surface of the sealing body is configured to engage with a bottom surface of the key slot, so that the first end surface of the sealing body and the bottom surface of the key slot are closely fitted with each other to form the seal.

In one embodiment, a first through hole and a second through hole are respectively provided in sidewall regions of the outer cover and the support ring corresponding to the hydraulic chambers, respectively, and the first through hole communicates with the second through hole to form a liquid injection port in communication with a corresponding hydraulic chamber, for injecting hydraulic fluid into the hydraulic chamber.

In one embodiment, the liquid injection port is sealed by a high pressure ball plug.

In one embodiment, the support ring comprises a cylindrical support ring body and a cover plate fitted with the support ring body, and the support ring body is adaptively arranged on an outer peripheral surface of the rubber member, while the cover plate is fitted with the support ring body in a sealing manner, so that the support ring covers the recesses to form the hydraulic chambers.

In one embodiment, the core shaft is configured as a stepped shaft with a central projecting portion, each axial end of which is formed as a conical surface, and the flow channel groove is arranged in an axial middle region of the central projecting portion.

In one embodiment, a radial protrusion extending radially outward is provided in a middle of each recess, a maximum outer diameter of the radial protrusion being less than that of the rubber member. A radial thickness in each of a circumferential direction and an axial direction of each hydraulic chamber in its central region is less than that in each of its two side regions.

In one embodiment, the core shaft is configured as a stepped shaft with a central projecting portion, each axial end of which is provided with an annular protrusion radially outwardly extending. The flow channel groove is arranged in an axial middle region of the central projecting portion.

In one embodiment, a radial protrusion extending radially inward is provided on an inner wall region of the cover plate, an inner diameter of the radial protrusion being larger than that of each hydraulic chamber. A radial thickness in each of the circumferential direction and the axial direction of each hydraulic chamber in its central region are less than that in each of its two side regions.

In one embodiment, the hydraulic composite bushing is able to, under different operating conditions, achieve a preset ratio $\lambda_n$, of dynamic stiffness to static stiffness, which is not less than 2 at a preset threshold frequency $f_n$. Under a same ratio $\lambda$ of dynamic stiffness to static stiffness, a ratio $\beta$ of length to diameter of the flow channel pipe at each preset threshold frequency $f_n$ satisfies following relationships: $\beta=L/D$; $\beta_1>\beta_2> \ldots >\beta_n$; and $\beta_1-\beta_2>\beta_2-\beta_3> \ldots >\beta_{n-1}-\beta_n$, and under a same threshold frequency f, an equivalent piston area S of each hydraulic chamber under respective $\lambda_n$ satisfies following relationships: $S_1<S_2< \ldots <S_n$, and $S_2-S_1>S_3-S_2> \ldots >S_n-S_{n-1}$, wherein: $f_n$ is a threshold frequency of the hydraulic composite bushing; $\lambda_n$ is the ratio of dynamic stiffness to static stiffness of the hydraulic composite bushing; n is a non-zero natural number; $f_n$ and $\lambda_n$ are each an increasing arithmetic progression; L is a length of the flow channel pipe; D is a hydraulic diameter of the flow channel pipe; $\beta_n$ is the ratio of length to diameter of the flow channel pipe; and $S_n$ is the equivalent piston area of the hydraulic chamber.

According to a second aspect of the present invention, a sealing method for a hydraulic composite bushing is proposed, comprising steps of: arranging the flow channel pipe in the flow channel groove to extend in a spiral shape; mounting the sealing device at each end of the flow channel pipe, and forming the pressing sleeve on an outer peripheral surface of the core shaft by injection molding; and forming the rubber member on the outer peripheral surface of the core shaft by vulcanization of rubber so as to form the hydraulic chambers inside the rubber member, and passing the sealing device through the rubber member to extend into a corresponding hydraulic chamber, wherein the pressing sleeve fills the rectangular through hole of the sealing device during the injection molding to form a seal between the flow channel pipe and the flow channel groove, and during the vulcanization, a tip of a second end of the sealing device extends into the hydraulic chamber by a length not less than 5 mm.

Compared with the prior arts, the present invention has the following advantages.

According to the present invention, two radially opposite hydraulic chambers of the hydraulic composite bushing are in communication with each other through the flow channel pipe arranged in a spiral shape, so that the hydraulic composite bushing 100 can realize stiffness adjustments in the radial hollow direction, the radial real direction and the axial direction. Therefore, the performance of stiffness adjustment of the hydraulic composite bushing is greatly enhanced, and the fatigue performance of the product is effectively improved. The flow channel pipe and the flow channel groove are sealed relative to each other by the sealing device, which significantly enhances the sealing performance between the flow channel pipe and the flow channel groove, thereby effectively preventing leakage caused by flow of the hydraulic fluid in a gap formed between the flow channel pipe and the flow channel groove. In addition, the procedure of arrangement and installation of the flow channel pipe and the sealing device is simple and convenient. Moreover, the core shaft, the rubber member, the support ring and the pressing sleeve are integrally formed by vulcanization, which significantly enhances the integrity and stiffness of the hydraulic composite bushing, improves the flexibility of the stiffness adjustment of the hydraulic composite bushing, and effectively prolongs the service life of the hydraulic composite bushing. The sealing method for the hydraulic composite bushing according to the present invention requires a simple structure only, can meet high stiffness requirements, improve the sealing performance, prolong the service life, and has high production efficiency, which is suitable for mass production.

BRIEF DESCRIPTION OF THE DRAWINGS

The present invention will be explained with reference to accompanying drawings, in which.

In this application, all drawings are schematic ones used to illustrate the principle of the present invention only, and are not drawn to actual scale

DETAILED DESCRIPTION OF THE EMBODIMENTS

The present invention will be described below with reference to the accompanying drawings.

Figure 2:
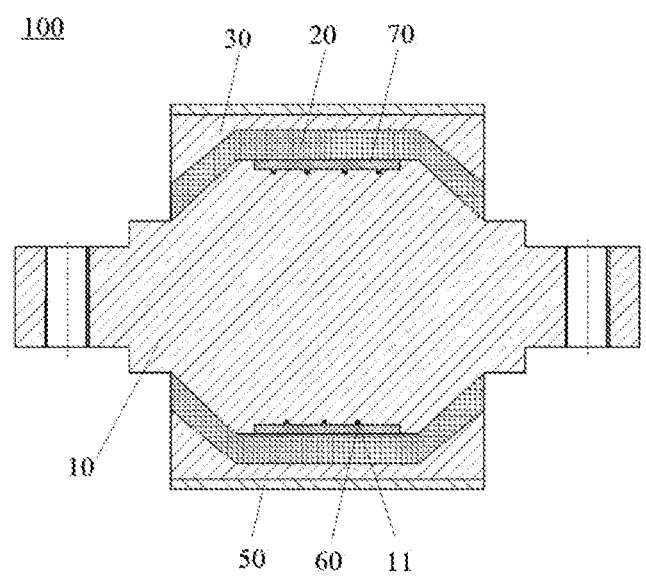
FIG. 2 is a cross-sectional view taken along line C-C in FIG. 1.

It should note that the terms "axial" and "radial" in the context refer to the horizontal direction and the vertical direction in FIG. 2, respectively, and the radial direction associated with a part of the hydraulic composite bushing 100 with the hydraulic chambers therein is defined as the hollow radial direction, while the radial direction associated with a part thereof without the hydraulic chambers is defined as the solid radial direction.

Figure 1:
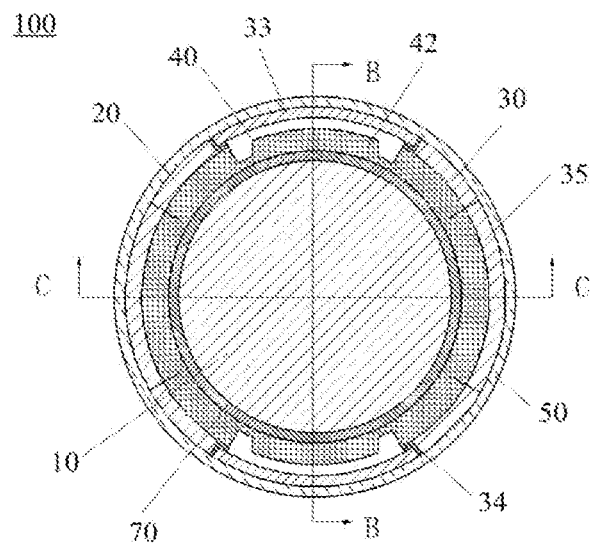
FIG. 1 is an axial cross-sectional view of a hydraulic composite bushing according to one embodiment of the present invention.

FIG. 1 is an axial cross-sectional view of a hydraulic composite bushing 100 according to one embodiment of the present invention. As shown in FIG. 1, the hydraulic composite bushing 100 includes a core shaft 10, a rubber member 20 disposed on an outer periphery of the core shaft 10, a support ring 30 arranged on the rubber member 20 at an radially outer side thereof, and an outer cover 50 pressed on the support ring 30 through interference fit at an radially outer side thereof. The core shaft 10 is usually a pre-formed element, and both ends of the core shaft 10 can be connected to, for example, a bogie frame of a rail vehicle. The core shaft 10 and the support ring 30 are integrally formed by vulcanization, which greatly enhances the overall performance of the hydraulic composite bushing 100.

Figure 3:
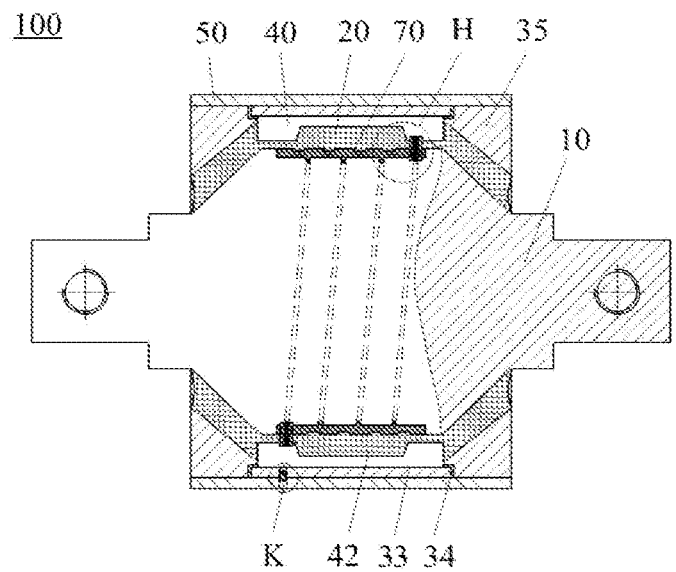
FIG. 3 is a cross-sectional view taken along line B-B in FIG. 1.

According to the present invention, a flow channel groove 11 is formed on an outer surface of the core shaft 10. As shown in FIG. 2 and FIG. 3, the flow channel groove 11 is formed in a spiral shape around the outer surface of the core shaft 10, and extends in a continuous manner along a circumferential direction and an axial direction of the core shaft 10. The function of the flow channel groove 11 will be described below.

As shown in FIGS. 1 to 3, the rubber member 20 is arranged on the outer surface of the core shaft 10. Preferably, the rubber member 20 is formed by vulcanization in such a way of conforming to the contour of the outer surface of the core shaft 10. The rubber member 20 is provided with two recesses, which are arranged radially opposite to each other. Said two recesses are arranged at a radially outer side of the flow channel groove 11 accordingly. The two recesses are configured to extend over a part of the whole circumferential direction, and located in a middle region of the rubber member 20 along the axial direction. The support ring 30 is arranged around the outer peripheral surface of the rubber member 20 accordingly, and completely covers the recesses of the rubber member 20, thereby forming two sealed hydraulic chambers 40 between the support ring 30 and the rubber member 20, which are arranged radially opposite to each other and used to accommodate hydraulic fluid.

Figure 4:
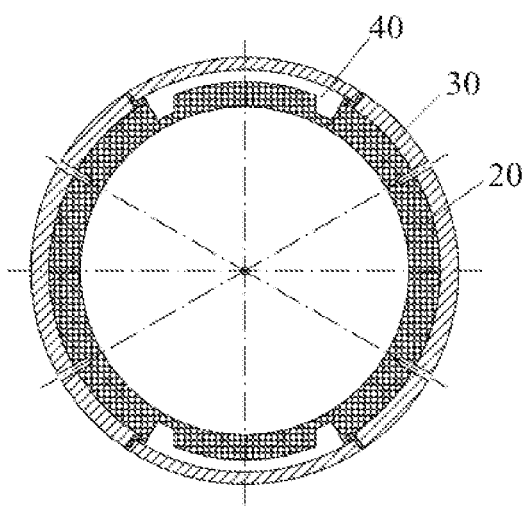
FIG. 4 shows the structure of a rubber member and a support ring according to one embodiment.

In one embodiment, the rubber member 20 and the support ring 30 of the hydraulic composite bushing 100 can be designed as a structure consisting of multiple lobes, dependent on a thickness of the support ring 30. As shown in FIG. 4, the number of lobes of the hydraulic composite bushing 100 may be determined according to the amount of interference. This can further improve the performance of stiffness adjustment of the hydraulic composite bushing 100.

Figure 5:
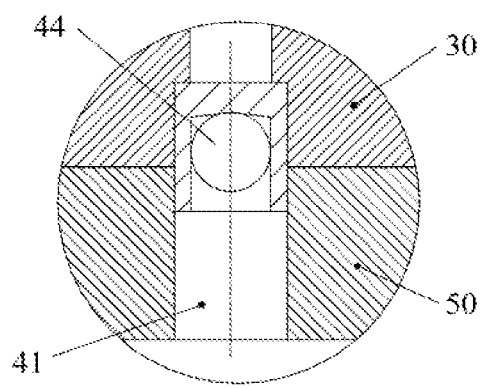
FIG. 5 is an enlarged view of area K in FIG. 3.

In this embodiment, a first through hole and a second through hole are respectively formed in a side wall of the outer cover 50 and that of the support ring 30 both corresponding to the hydraulic chambers 40. As shown in FIG. 5, the first through hole is in communication with the second through hole, thus forming a liquid injection port 41 that is in communication with a respective hydraulic chamber 40. The liquid injection port 41 is used to inject the hydraulic fluid into the hydraulic chamber 40. The liquid injection port 41 is sealed with a high pressure ball plug 44. The liquid injection port 41 can be opened by the high pressure ball plug 44, in order to replenish the hydraulic fluid into the hydraulic chamber 40. After that, the liquid injection port 41 can be effectively blocked by the high pressure ball plug 44, thereby closing the liquid injection port 41. The high pressure ball plug 44 can effectively seal the liquid injection port 41, which is very beneficial to improve the sealing reliability of the hydraulic chamber 40.

According to the present invention, a flow channel pipe 60 is arranged in the flow channel groove 11. The flow channel pipe 60 is arranged in the flow channel groove 11, so as to extend around the core shaft 10 in a spiral manner. Two ends of the flow channel pipe 60 pass through the rubber member 20 along the radial direction thereof, respectively, to extend into the hydraulic chambers 40, so that said two hydraulic chambers 40 are in communication with each other through the flow channel pipe 60. The flow channel pipe 60 can be made of copper tube, stainless steel tube, plastic tube or the like, which can effectively improve the stiffness of the flow channel pipe 60. Therefore, by arranging the flow channel pipe 60 for liquid flow in the flow channel groove 11, lateral displacement of the liquid in the flow channel groove 11 can be effectively avoided, so that the sealing effect of the overall structure of the hydraulic composite bushing 100 is significantly enhanced.

In order to facilitate the installation and engagement between the flow channel pipe 60 and the flow channel groove 11 to enhance the structural strength of the tubular body of the flow channel pipe 60, the bottom of the flow channel groove 11 is configured as a semi-circle structure, which corresponds to the cross section of the tubular body of the flow channel pipe 60. The top of the flow channel groove 11 is configured as a square groove, which has a width equal to a diameter of the tubular body of the flow channel pipe 60. The overall depth of the flow channel groove 11 is greater than the diameter of the tubular body of the flow channel pipe 60. In this manner, it can ensure that more plastic will enter into the flow channel groove 11 during injection, thereby effectively fixing the tubular body of the flow channel pipe 60. In the meantime, when a pressing sleeve 70 is subjected to a larger shock load, more load can be distributed on a metal spacer of the core shaft, thereby effectively protecting the flow channel pipe 60.

In this embodiment, a pressing sleeve 70 is provided between the core shaft 10 and the rubber member 20 in the radial direction. As shown in FIGS. 1 to 3, the pressing sleeve 70 is disposed on an area of the outer surface of the core shaft 10 where the flow channel groove 11 is provided. In one embodiment, an annular recess is provided on the outer peripheral surface of the core shaft 10, and the flow channel groove 11 is arranged at the bottom of the annular recess. The pressing sleeve 70 is arranged in the annular recess, and has an outer diameter equal to the outer diameter of the core shaft 10. In this manner, the outer peripheral surface of the press sleeve 70 is flush with that of the core shaft 10. The pressing sleeve 70 can apply on the flow channel pipe 60 a mounting pressure, which is directed radially inward. The axial length of the pressing sleeve 70 is greater than the length of the flow channel pipe 60 extending in the axial direction, so as to ensure that the flow channel pipe 60 is totally pressed by the pressing sleeve 70. In addition, both ends of the flow channel pipe 60 are arranged to pass through the pressing sleeve 70 in the radial direction thereof, and then continue to extend along the radial direction of the rubber member 20 to pass therethrough, until the ends of the flow channel pipe 60 extend into the respective hydraulic chambers 40. In one embodiment, the pressing sleeve 70 may be made of plastic, rubber, polyurethane material or the like, and formed on the outer surface of the core shaft 10 by injection molding.

In order to increase the bonding area between the rubber member 20 and the pressing sleeve 70 to enhance the bonding strength therebetween, a groove can be formed on an outer surface of the pressing sleeve 70. The groove may have a cross-sectional shape of ellipse, square, or the like.

In practical applications, when the rail vehicle is under some special working conditions, the movement of the wheels will drive the core shaft 10 and the outer cover 50 to move relative to each other, so that the hydraulic chamber 40 in the front and the hydraulic chamber 40 in the rear will experience expansion and contraction, respectively. In this way, the hydraulic fluid can flow between the two hydraulic chambers 40, so that the stiffness of the hydraulic composite bushing 100 can be adjusted accordingly. As a result, the rail vehicle can keep running stably. This varying stiffness is an important property of the hydraulic composite bushing 100. These features and functions of the hydraulic composite bushing 100 are known in the art, which can be known, for example, from CN108150536A of the same applicant, which is incorporated herein by reference.

Figure 6:
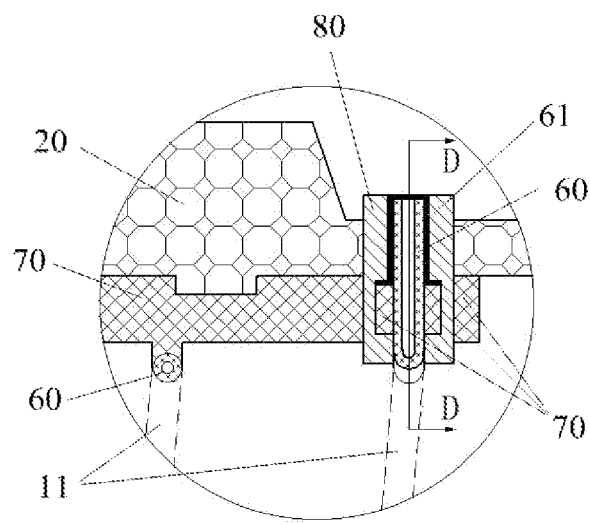
FIG. 6 is an enlarged view of area H in FIG. 3.

According to the present invention, the hydraulic composite bushing 100 also includes a sealing device 80. As shown in FIG. 6, the sealing device 80 is arranged at each end of the flow channel pipe 60, in order to form a seal between the flow channel pipe 60 and the flow channel groove 11 of the core shaft 10, thereby avoiding leakage of hydraulic fluid. In addition, the sealing device 80 can effectively prevent each end of the flow channel pipe 60 from being bent and deformed due to the internal pressure of a mold cavity during the injection molding and the vulcanization of the rubber member 20.

Figure 7:
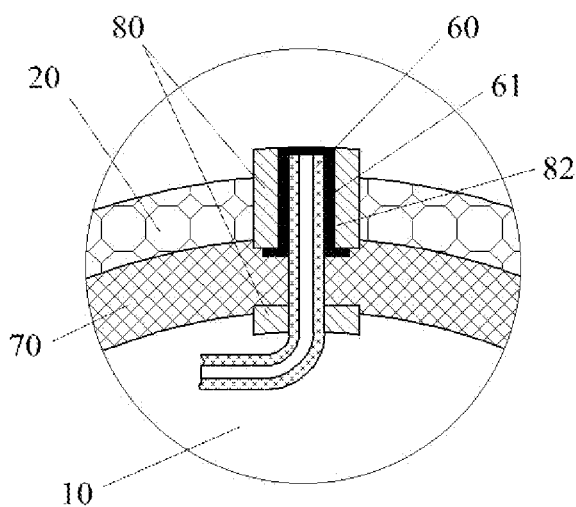
FIG. 7 is a cross-sectional view taken along line D-D in FIG. 6.
Figure 8:
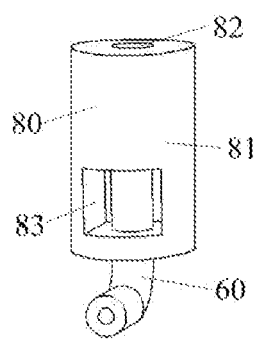
FIG. 8 shows the structure of a sealing device.

As shown in FIGS. 6 to 8, the sealing device 80 includes a cylindrical sealing body 81. A mounting portion 82, which is a through hole penetrating the sealing body 81 in the axial direction, is arranged in the sealing body 81 for receiving the flow channel pipe 60. The sealing body 81 is further provided with a rectangular through hole 83 extending in the radial direction. The end of the flow channel pipe 60 extends over the rectangular through hole 83 along the axial direction of the sealing body 81 to be fitted within the mounting portion 82. Therefore, the sealing device 80 can be mounted at each end of the flow channel pipe 60. A first end of the sealing body 81 is fitted within the flow channel groove 11, and a second end thereof passes through the pressing sleeve 70 and the rubber member 20 in sequence to extend into the hydraulic chamber 40. During the injection molding, the pressing sleeve 70 disposed between the core shaft 10 and the rubber member 20 will completely fill the rectangular through hole 83, and thus entirely enclose the flow channel pipe 60. Therefore, an effective seal is formed between the flow channel pipe 60 and the sealing body 81, thus effectively preventing the liquid from entering the gap between the flow channel pipe 60 and the flow channel groove 11 to cause leakage. In this manner, the flow channel pipe 60 and the flow channel groove 11 are sealed by the sealing device 80. The structure of the sealing device 80 effectively improves the sealing reliability of the flow channel pipe 60, the hydraulic chamber 40 and the connecting area therebetween, which is very beneficial to enhance the sealing performance between the flow channel pipe 60 and the flow channel groove 11. Moreover, it is also convenient to mount the sealing device 80.

In one embodiment, a filter element 61 is provided at each end of the flow channel pipe 60. The filter element 61 can be, for example, a filter screen, which has a lower end surface that can be positioned through an end face of the rectangular through hole 83, and an upper end surface that is flush with an upper end face of the sealing body 81. The filter element 61 can effectively prevent debris generated inside the hydraulic chambers 40 from clogging the flow channel pipe 60 in operation.

In order to prevent rubber material from penetrating into the flow channel pipe 60 to cause blockage during the vulcanization of the rubber member 20, the end of the flow channel pipe 60 extending into the hydraulic chamber 40 is arranged to extend over a radially inner wall surface of the hydraulic chamber 40. In particular, said end extends over the radially inner wall surface of the hydraulic chamber 40 by at least 5 mm. This stepped layer structure can enlarge the engagement area between the sealing device 80 and the injection mold for vulcanization, and in particular, effectively prevent the blockage caused by the penetration of the rubber material into the flow channel pipe 60 during the vulcanization.

In this embodiment, a key slot is provided at each end of the flow channel groove 11 of the core shaft 10. An end face of the first end of the sealing body 81 is configured to be fitted with a bottom face of the key slot, so that said end face of the first end of the sealing body 81 can closely contact with the bottom face of the key slot. Preferably, the end face of the first end of the sealing body 81 and the bottom face of the key slot can be configured as arc-shaped curved surfaces engaged with each other. In this way, the sealing device 80 can be effectively mounted and fixed, and an effective seal can be formed between the sealing device 80 and the flow channel groove 11. Thus, the sealing performance between the flow channel pipe 60 and the flow channel groove 11 can be further improved, and leakage caused by the hydraulic fluid flowing between the flow channel pipe 60 and the flow channel groove 11 can be effectively avoided.

According to the present invention, the rubber member 20 is configured to conform to the outer contour of the core shaft 10. In addition, the core shaft 10, the support ring 30 and the pressing sleeve 70 are formed into one piece by vulcanization, which effectively enhances the overall performance of the hydraulic composite bushing 100. The core shaft 10 may have different structures, and the specific structures of the core shaft 10 and the rubber member 20 according to different embodiments will be described in detail below.

FIGS. 1 to 3 show the structure of the hydraulic composite bushing 100 according to one embodiment of the present invention. As shown in FIGS. 2 and 3, the core shaft 10 is configured as a stepped shaft with a central projecting portion. Each axial end of the central projecting portion is form as a conical surface, so that each axial end of the central projecting portion of the core shaft 10 has a diameter gradually increasing from the axial end to a middle region between two conical surfaces of the central projecting portion, but the middle region has an unchanged diameter. The flow channel groove 11 is provided in the axial middle region of the central projecting portion, and each end of the flow channel groove 11 terminates axially inner of a corresponding conical surface.

In this embodiment, the rubber member 20 is formed by vulcanization in a manner of conforming to the outer surface contour of the core shaft 10, whereby the rubber member 20 forms the same structure as the outer contour of the core shaft 10. That is, two axial ends of the rubber member 20 each form a conical surface, while the middle region thereof forms a cylindrical surface, so that the rubber member 20 forms a substantially V-shaped structure on the end surface along the diameter direction of the core shaft 10 (as shown in FIGS. 2 and 3). In addition, two recesses extend radially inward, and are disposed diametrically opposite to each other in the axial middle region of the rubber member 20, so that they are located radially outer of the flow channel groove 11 of the core shaft 10 accordingly. The V-shaped structure of the rubber member 20 can realize a flexible adjustment on the stiffness of three directions, i.e., the hollow radial direction, the solid radial direction and the axial direction, in the overall structure, thus effectively improving the fatigue performance of the product.

As shown in FIGS. 1 to 3, the support ring 30 includes a cylindrical support ring body 35, and a cover plate 33 fitted to the support ring body 35. The inner sidewall of the support ring 30 is configured to have a diameter increasing from each end toward the middle region in the axial direction, so that the surface of the inner sidewall of the support ring 30 is configured to be able to, at each end thereof, fit with the V-shaped conical surface of each end of the rubber member 20. The support ring body 35 is arranged on the outer peripheral surface of the rubber member 20, and the cover plate 33 and the support ring body 35 are fitted with each other in a sealing manner, so that the support ring 30 covers the recesses to form the hydraulic chambers 40. In the sidewall region of the support ring body 35 corresponding to each recess is formed with a stepped hole, which penetrates the sidewall of the support ring body 35, with a rubber layer 34 vulcanized on a stepped face of the stepped hole. The cover plate 33 is adaptively mounted in the stepped hole, and in particular fitted with the stepped face of the stepped hole vulcanized with the rubber layer 34 to completely cover the corresponding recess, so that the hydraulic chamber 40 is formed between the support ring 30 and the rubber member 20. The outer cover 50 is arranged around the support ring 30 from a radially outer side thereof through an interference fit, in order to form a press-fit seal on the support ring body 35 and the cover plate 33. Therefore, the rubber member 20, the support ring body 35 and the cover plate 33 jointly form a seal for the hydraulic chambers 40.

According to the present invention, the cover plate 33 covers the recess to form the hydraulic chamber 40 together with the recess. A radial protrusion 42 extending radially outward is provided in the middle of each recess, and has a maximum outer diameter smaller than the maximum outer diameter of the rubber member 20. In addition, each hydraulic chamber 40 has a radial thickness in a central region along the circumferential direction which is smaller than that in each of two side regions along the circumferential direction, and has a radial thickness in a central region along the axial direction which is smaller than that in each of two side regions along the axial direction. The radial protrusion 42 can restrict the scope of relative movement between the outer cover 50 and the core shaft 10, so as to achieve secondary stiffness.

Figure 9:
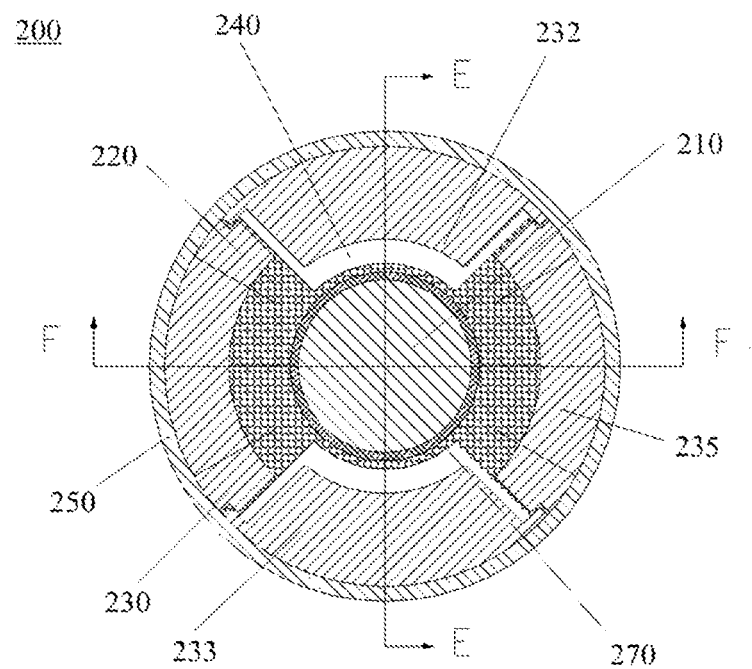
FIG. 9 is an axial cross-sectional view of a hydraulic composite bushing according to another embodiment of the present invention.
Figure 10:
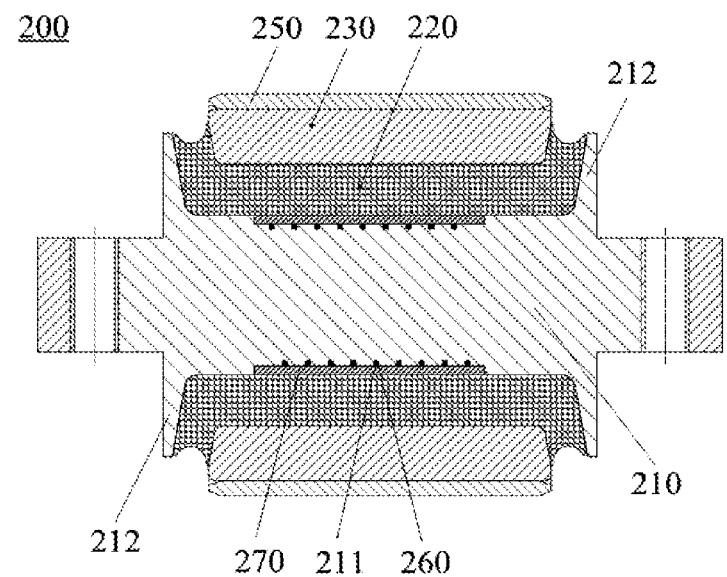
FIG. 10 is a cross-sectional view taken along line F-F in FIG. 9.
Figure 11:
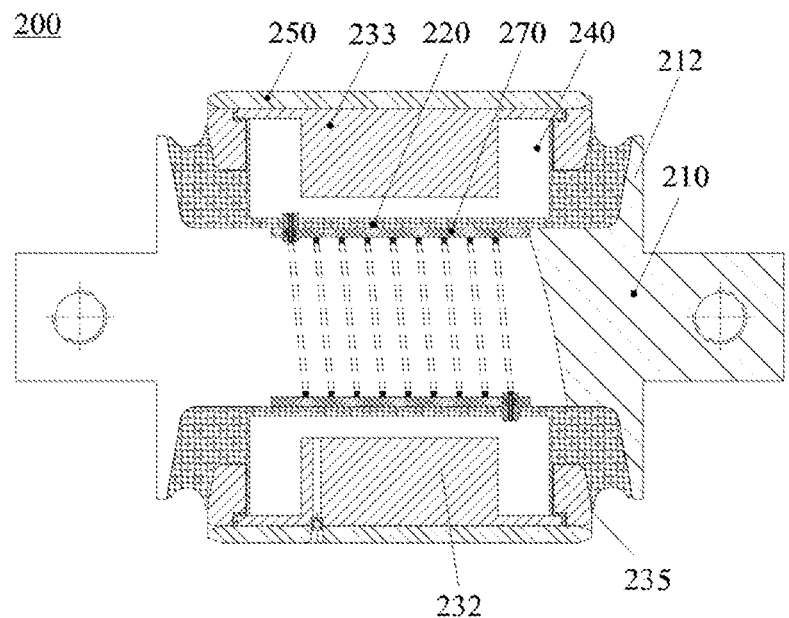
FIG. 11 is a cross-sectional view taken along line E-E in FIG. 9.

FIGS. 9 to 11 show the structure of a hydraulic composite bushing 200 according to another embodiment of the present invention. As shown in FIGS. 10 and 11, a core shaft 210 is configured as a stepped shaft having a central projecting portion, which has an annular protrusion 212 extending radially outward at each of both axial ends of the central projecting portion. A flow channel groove 211 is formed in an axial middle part of the central projecting portion, and located between two annular protrusions 212 in the axial direction. Each end of the flow channel groove 211 terminates axially inner of a corresponding annular protrusion 212.

In this embodiment, a rubber member 220 is disposed between the two annular protrusions 212 along the axial direction. The rubber member 220 is formed on the outer peripheral surface of the core shaft 210 by vulcanization, in a manner of conforming to the outer contour of the core shaft 210, so that the rubber member 220 has the same structure as the outer contour of the core shaft 10. In addition, a pressing sleeve 270 is formed on the outer circumference of the core shaft 210 in a middle region thereof, for pressing a flow channel pipe 260 into a spiral flow channel groove 211 formed in the surface of the core shaft 210. Two recesses extend radially inward, and are arranged in an axial middle region of the rubber member 220 in a manner of diametrically opposite to each other, so that they are located radially outside of the flow channel groove 211 on the core shaft 210.

As shown in FIG. 11, a support ring 230 includes a cylindrical support ring body 235, and a cover plate 233 fitted to the support ring body 235. The support ring 230 is bonded with the core shaft 210 into one piece through vulcanization. In the sidewall region of the support ring body 35 corresponding to each recess is formed with a stepped hole, which penetrates the sidewall of the support ring body 235, with a rubber layer vulcanized on a stepped face of the stepped hole. The cover plate 33 is adaptively mounted in the stepped hole, and in particular fitted with the stepped face of the stepped hole vulcanized with the rubber layer to completely cover the corresponding recess, so that a hydraulic chamber 240 is formed between the support ring 230 and the rubber member 220. An outer cover 250 is arranged around the support ring 230 from a radially outer side thereof through an interference fit, in order to form a press-fit seal on the support ring body 235 and the cover plate 233. Therefore, the rubber member 220, the support ring body 235 and the cover plate 233 jointly form a seal for the hydraulic chambers 240. The structure of the support ring 230 can not only effectively ensure the sealing property of the hydraulic chamber 40, but also enhance the integrity of the support ring 230 and the rubber member 220, which further enhances the stiffness performance of the hydraulic composite bushing 200, thereby ensuring stable operation of the train.

In the present embodiment, a radial protrusion 232 extending radially outward is provided in the sidewall region of the cover plate 233 corresponding to the hydraulic chamber 240, and has an inner diameter larger than the inner diameter of the hydraulic chamber 240. In this manner, each hydraulic chamber 40 has a radial thickness in a central region along the circumferential direction which is smaller than that in each of two side regions along the circumferential direction, and has a radial thickness in a central region along the axial direction which is smaller than that in each of two side regions along the axial direction. The radial protrusion 232 can similarly restrict the scope of relative movement between the outer cover 250 and the core shaft 210, so as to achieve secondary stiffness.

Figure 12:
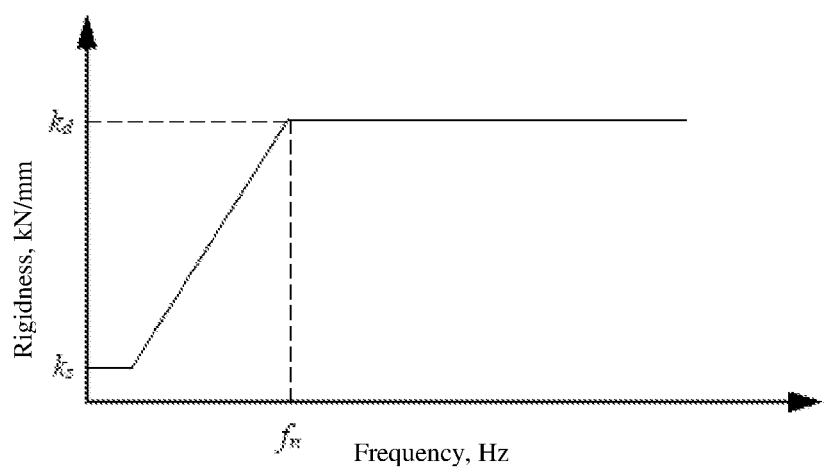
FIG. 12 is a schematic diagram showing stiffness of the hydraulic composite bushing according to the present invention.

According to the present invention, under different operating conditions of the hydraulic composite bushing 100, the hydraulic composite bushing 100 can achieve a preset ratio $\lambda_n$ of dynamic stiffness to static stiffness at a preset threshold frequency $f_n$, wherein $\lambda_n = K_s/K_d$ and is not less than 2. FIG. 12 is a schematic diagram showing stiffness of the hydraulic composite bushing 200. To this end, the flow channel pipe 60 or the hydraulic chamber 40 should meet the following conditions, that is, a ratio $\beta$ of length to diameter of the flow channel pipe 60 at each preset threshold frequency f should satisfy the following relationship:

$\beta = L/D,$ $\beta_1 > \beta_2 > \ldots > \beta_n,$ and $\beta_1 - \beta_2 > \beta_2 - \beta_3 > \ldots > \beta_{n-1} - \beta_n.$ For example, eight preset threshold frequencies are 1 Hz, 2 Hz, 3 Hz, 4 Hz, 5 Hz, 6 Hz, 7 Hz and 8 Hz, respectively, and β at each frequency is: $\beta_1$, $\beta_2$, $\beta_3$, $\beta_4$, $\beta_5$, $\beta_6$, $\beta_7$ and $\beta_8$. In order to achieve a predetermined $\lambda_n$ at a preset threshold frequency $f_n$, β at each frequency must satisfy: $\beta_1 > \beta_2 > \beta_3 > \beta_4 > \beta_5 > \beta_6 > \beta_7 > \beta_8$, and $\beta_1 - \beta_2 > \beta_2 - \beta_3 > \ldots > \beta_6 - \beta_7 > \beta_7 - \beta_8$.

At the same time, an equivalent piston area S of each hydraulic chamber 40 under each preset $\lambda_n$ should satisfy the following relationship:

$S_1 < S_2 < \ldots < S_n,$ and $S_2 - S_1 > S_3 - S_2 > \ldots > S_n - S_{n-1},$ wherein: $f_n$ is the threshold frequency of the hydraulic composite bushing; $\lambda_n$ is the ratio of dynamic stiffness to static stiffness of the hydraulic composite bushing; n is a non-zero natural number; $f_n$ and $\lambda_n$ are each an increasing arithmetic progression; L is the length of the flow channel pipe; D is the hydraulic diameter of the flow channel pipe; $\beta_n$ is the ratio of length to diameter of the flow channel pipe; and $S_n$ is the equivalent piston area of the hydraulic chamber.

A sealing method for the hydraulic composite bush according to the present invention is described below. First, the flow channel pipe 60 is arranged in the flow channel groove 11, presenting a spiral shape. The sealing device 80 is fixedly mounted at each end of the flow channel pipe 60. Specifically, the end of the flow channel pipe 60 is mounted in the mounting portion 81 after extending over the rectangular through hole 83, and aligned with the second end of the sealing body 81. Subsequently, the pressing sleeve 70 is formed on the outer peripheral surface of the core shaft 10 by injection molding. During the injection molding, both ends of the flow channel tube 60 are exposed to pass through the pressing sleeve 70 in the radial direction, and the first end face of the sealing device 80 is formed as an arc-shaped surface, which corresponds to the key slot in the flow channel groove 11 and thus forms a tight fit therewith. At the same time, the pressing sleeve 70 fills the rectangular through hole 83 in the sealing device 80 to enclose the flow channel pipe 60 during the injection molding, thereby forming a seal between the flow channel pipe 60 and the flow channel groove 11. After that, rubber is vulcanized on the outer peripheral surface of the core shaft 10 to form the rubber member 20, so that the hydraulic chambers 40 are formed inside the rubber member 20. During the vulcanization, the sealing device 80 radially passes through the rubber member 40 to extend into the hydraulic chambers 40, with the length of the second end of the sealing device 80 extending into the hydraulic chambers 40 not less than 5 mm. This can effectively prevent both ends of the flow channel pipe 60 from being bent and deformed due to the internal pressure of a mold cavity during the injection molding and the vulcanization, and also effectively prevent the blockage caused by the penetration of the rubber material into the flow channel pipe 60 during the vulcanization of the rubber member 20. Then, the support ring 30 and the core shaft 10 are bonded into one piece by vulcanization, and a rubber layer 34 is vulcanized on the stepped face of the stepped hole of the support ring body 35, and then the cover plate 33 is placed to cover the recess completely, so that the hydraulic chamber 40 is formed between the support ring 30 and the rubber member 20. Finally, the outer cover 50 is placed on the support ring 30 from the radially outer side thereof through interference fit, thus forming a press-fit seal on the support ring body 35 and the cover plate 33. Therefore, the rubber member 20, the support ring 30 and the cover plate 33 jointly form a seal for the hydraulic chambers 40. In this manner, the hydraulic composite bushing 100 is completed, with sealing effect achieved for the flow channel pipe 60, the hydraulic chambers 40 and connections thereof.

According to the present invention, two radially opposite hydraulic chambers 40 of the hydraulic composite bushing 100 are in communication with each other through the flow channel pipe 60 arranged in a spiral shape, so that the hydraulic composite bushing 100 can realize stiffness adjustments in the radial hollow direction, the radial real direction and the axial direction. Therefore, the performance of stiffness adjustment of the hydraulic composite bushing 100 is greatly enhanced, and the fatigue performance of the product is effectively improved. The flow channel pipe 60 and the flow channel groove 11 are sealed relative to each other by the sealing device 80. The sealing device 80 significantly enhances the sealing performance between the flow channel pipe 60 and the flow channel groove 11, thereby effectively preventing leakage caused by flow of the hydraulic fluid in the gap formed between the flow channel pipe 60 and the flow channel groove 11. In addition, the procedure of arrangement and installation of the flow channel pipe 60 and the sealing device is simple and convenient. Moreover, the core shaft 10, the support ring 30 and the pressing sleeve 70 are integrally formed by vulcanization, which significantly enhances the integrity and stiffness of the hydraulic composite bushing 100, improves the flexibility of the stiffness adjustment of the hydraulic composite bushing 100, and effectively prolongs the service life of the hydraulic composite bushing 100. The sealing method for the hydraulic composite bushing according to the present invention requires a simple structure only, can meet high stiffness requirements, improve the sealing performance, prolong the service life, and has high production efficiency, which is suitable for mass production.

Finally, it should note that the foregoing introduces preferred embodiments of the present invention merely, and does not constitute any limitations to the present invention. Although the present invention has been described in detail with reference to the above embodiments, for those skilled in the art, the technical solutions recited in the above embodiments can still be modified, or some technical features thereof can be equivalently replaced. Any modifications, equivalent replacements, improvements or the like made within the spirit and principle of the present invention shall be included within the scope of protection scope of the present invention.

The invention claimed is:

1. A hydraulic composite bushing, comprising:
a core shaft, an outer surface of which is provided with a flow channel groove continuously extending in a spiral shape;
a rubber member, arranged on the core shaft and provided with two recesses diametrically opposite to each other, the recesses being arranged radially outside of the flow channel groove;
a support ring, arranged around the rubber member, and covering the recesses to form two hydraulic chambers for accommodating hydraulic fluid;
an outer cover press-fitted on the support ring from a radially outer side thereof; and a sealing device mounted at an end of a flow channel pipe arranged in the flow channel groove, wherein two ends of the flow channel pipe pass through the rubber member along a radial direction to extend into said two hydraulic chambers, respectively, so that said two hydraulic chambers are in communication with each other through the flow channel pipe, wherein the sealing device is arranged at each end of the flow channel pipe, wherein one end of the sealing device is arranged in the flow channel groove while the other end thereof passes through the rubber member to extend into a corresponding hydraulic chamber, thus forming a seal between the flow channel pipe and the flow channel groove, wherein a pressing sleeve is provided between the core shaft and the rubber member and arranged for press-fitting the flow channel pipe into the flow channel groove, wherein the sealing device comprises a cylindrical sealing body, which is provided with a mounting portion axially penetrating the sealing body and a rectangular through hole extending in the radial direction, and wherein the end of the flow channel pipe passes through the rectangular through hole and is fitted in the mounting portion, the pressing sleeve filling the rectangular through hole to enclose the flow channel pipe.

2. The hydraulic composite bushing according to claim 1, wherein the pressing sleeve is one piece with the core shaft and formed of plastic, rubber or polyurethane material.

3. The hydraulic composite bushing according to claim 1, wherein a first end of the sealing body is fitted with the flow channel groove, and a second end thereof passes through the rubber member to extend into a corresponding hydraulic chamber, wherein a tip of the second end extends beyond a radially inner sidewall surface of the hydraulic chamber by at least 5 mm.

4. The hydraulic composite bushing according to claim 1, wherein the end of the flow channel pipe is fixedly connected with a filter element via the sealing device.

5. The hydraulic composite bushing according to claim 1, wherein a key slot is provided at each end of the flow channel groove, and a first end surface of the sealing body is configured to engage with a bottom surface of the key slot, so that the first end surface of the sealing body and the bottom surface of the key slot are closely fitted with each other to form the seal.

6. The hydraulic composite bushing according to claim 1, wherein a first through hole and a second through hole are respectively provided in sidewall regions of the outer cover and the support ring corresponding to the hydraulic chambers, respectively, and the first through hole communicates with the second through hole to form a liquid injection port in communication with a corresponding hydraulic chamber, for injecting hydraulic fluid into the hydraulic chamber.

7. The hydraulic composite bushing according to claim 6, wherein the liquid injection port is sealed by a high-pressure ball plug.

8. The hydraulic composite bushing according to claim 1, wherein the support ring comprises a cylindrical support ring body and a cover plate fitted with the support ring body, and the support ring body is adaptively arranged on an outer peripheral surface of the rubber member, while the cover plate is fitted with the support ring body in a sealing manner, so that the support ring covers the recesses to form the hydraulic chambers.

9. The hydraulic composite bushing according to claim 1, wherein the core shaft is configured as a stepped shaft with a central projecting portion, each axial end of which is formed as a conical surface, the flow channel groove being arranged in an axial middle region of the central projecting portion.

10. The hydraulic composite bushing according to claim 9, wherein a radial protrusion extending radially outward is provided in a middle of each recess, a maximum outer diameter of the radial protrusion being less than that of the rubber member, and a radial thickness in each of a circumferential direction and an axial direction of each hydraulic chamber in its central region is less than that in each of its two side regions.

11. The hydraulic composite bushing according to claim 8, wherein the core shaft is configured as a stepped shaft with a central projecting portion, each axial end of which is provided with an annular protrusion radially outwardly extending, and the flow channel groove is arranged in an axial middle region of the central projecting portion.

12. The hydraulic composite bushing according to claim 11, wherein a radial protrusion extending radially inward is provided on an inner wall region of the cover plate, an inner diameter of the radial protrusion being larger than that of each hydraulic chamber, and a radial thickness in each of the circumferential direction and the axial direction of each hydraulic chamber in its central region are less than that in each of its two side regions.

13. The hydraulic composite bushing according to claim 1, wherein the hydraulic composite bushing is arranged to, under different operating conditions, achieve a preset ratio $\Delta n$ of dynamic stiffness to static stiffness, which is not less than 2 at a preset threshold frequency fn, and under a same ratio $\lambda$ of dynamic stiffness to static stiffness, a ratio $\beta$ of length to diameter of the flow channel pipe at each preset threshold frequency fn satisfies following relationships:

$\beta = L/D,$ $\beta_1 > \beta_2 > \ldots > \beta_n,$ and $\beta_1 - \beta_2 > \beta_2 - \beta_3 > \ldots > \beta_{n-1} - \beta_n,$ and under a same threshold frequency f, an equivalent piston area S of each hydraulic chamber under respective $\lambda n$ satisfies following relationships:

$S_1 < S_2 < \ldots < S_n,$ and $S_2 - S_1 > S_3 - S_2 > \ldots > S_n - S_{n-1},$ wherein: fn is a threshold frequency of the hydraulic composite bushing; $\lambda n$ is the ratio of dynamic stiffness to static stiffness of the hydraulic composite bushing; n is a non-zero natural number; fn and $\Delta n$ are each an increasing arithmetic progression; L is a length of the flow channel pipe; D is a hydraulic diameter of the flow channel pipe; $\beta n$ is the ratio of length to diameter of the flow channel pipe; and Sn is the equivalent piston area of the hydraulic chamber.

14. A sealing method for a hydraulic composite bushing according to claim 1, comprising steps of:

arranging the flow channel pipe in the flow channel groove to extend in a spiral shape;

mounting the sealing device at each end of the flow channel pipe, and forming the pressing sleeve on an outer peripheral surface of the core shaft by injection molding; and forming the rubber member on the outer peripheral surface of the core shaft by vulcanization of rubber so as to form the hydraulic chambers inside the rubber member, and passing the sealing device through the rubber member to extend into a corresponding hydraulic chamber, wherein the pressing sleeve fills the rectangular through hole of the sealing device during the injection molding to form a seal between the flow channel pipe and the flow channel groove, and during the vulcanization, a tip of a second end of the sealing device extends into the hydraulic chamber by a length not less than 5 mm.

15. The sealing method according to claim 14, wherein the sealing device prevents each end of the flow channel pipe from being bent and deformed by internal pressure of a mold cavity during the injection molding and the vulcanization of the rubber member.

* * * * *